(12) United States Patent
Kariathungal et al.

(10) Patent No.: US 7,694,240 B2
(45) Date of Patent: Apr. 6, 2010

(54) METHODS AND SYSTEMS FOR CREATION OF HANGING PROTOCOLS USING GRAFFITI-ENABLED DEVICES

(75) Inventors: Murali Kumaran Kariathungal, Hoffman Estates, IL (US); Prakash Mahesh, Hoffman Estates, IL (US); Mark Morita, Arlington Heights, IL (US); Stephen P. Roehm, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 215 days.

(21) Appl. No.: 11/562,804

(22) Filed: Nov. 22, 2006

(65) Prior Publication Data

US 2008/0120576 A1    May 22, 2008

(51) Int. Cl.
*G06F 3/00* (2006.01)
(52) U.S. Cl. .................. 715/863; 715/702; 715/964
(58) Field of Classification Search ................. 715/863, 715/702, 964
See application file for complete search history.

(56) References Cited

U.S. PATENT DOCUMENTS

| | | | | |
|---|---|---|---|---|
| 6,243,095 | B1 * | 6/2001 | Shile et al. .................. | 715/854 |
| 7,421,647 | B2 * | 9/2008 | Reiner ......................... | 715/230 |
| 2006/0109237 | A1 * | 5/2006 | Morita et al. ................ | 345/156 |
| 2007/0274585 | A1 * | 11/2007 | Zhang et al. ................. | 382/132 |
| 2007/0282912 | A1 * | 12/2007 | Reiner ..................... | 707/104.1 |
| 2008/0103828 | A1 * | 5/2008 | Squilla et al. .................. | 705/3 |

OTHER PUBLICATIONS

Bolan, Cristen C., "What Radiologists Want in a Workstation", Sep. 2006, http://new.reillycomm.com/imaging/article_detail.php?id=175.*
Koenker, et al., "Automated Hands-Free Image Maniputlation and Viewing", 2002, Journal of Digital Imaging, vol. 15, Suppl 1, pp. 166-170.*
Beard DV, "A Radiology Workstation for Mammography: Preliminary Observations, eyetracker studies, and design", 1991, SPIE vol. 1446 Medical Imaging V: PACS Design and Evaluation, pp. 289-295.*
Luo, Hui, "Automatic Image Hanging Protocol for Chest Radiographs in PACS", Apr. 2006, IEEE Transactions on Information Technology in Biomedicine, vol. 10, No. 2, pp. 302-311.*
OTPedia, Information for Medical Imaging, "Hanging Protocol", http://www.otpedia.com/entry Details.cfm?id=153.*

* cited by examiner

*Primary Examiner*—Dennis Bonshock
(74) *Attorney, Agent, or Firm*—Hanley, Flight & Zimmerman, LLC

(57) ABSTRACT

Certain embodiments of the present invention provide methods and systems for hanging protocol generation using gesture recognition. Certain embodiments provide a method for creating a hanging protocol based on gesture input in a clinical environment. The method includes specifying a hanging protocol specification using gesture-based input. The method also includes translating the gesture-based input into a hanging protocol. The method further includes facilitating display of clinical information based on the hanging protocol. Certain embodiments provide a gesture detection system. The system includes a sensor surface configured to detect gesture-based input made on the sensor surface. The gesture-based input specifies a hanging protocol layout. The system also includes a processor configured to identify the gesture-based input and translate the gesture to a corresponding hanging protocol definition for display of image and clinical data.

17 Claims, 9 Drawing Sheets

Size of the gesture is a modifier for the size of the feature

Position of the gesture is a modifier for the specific area of the image to affect

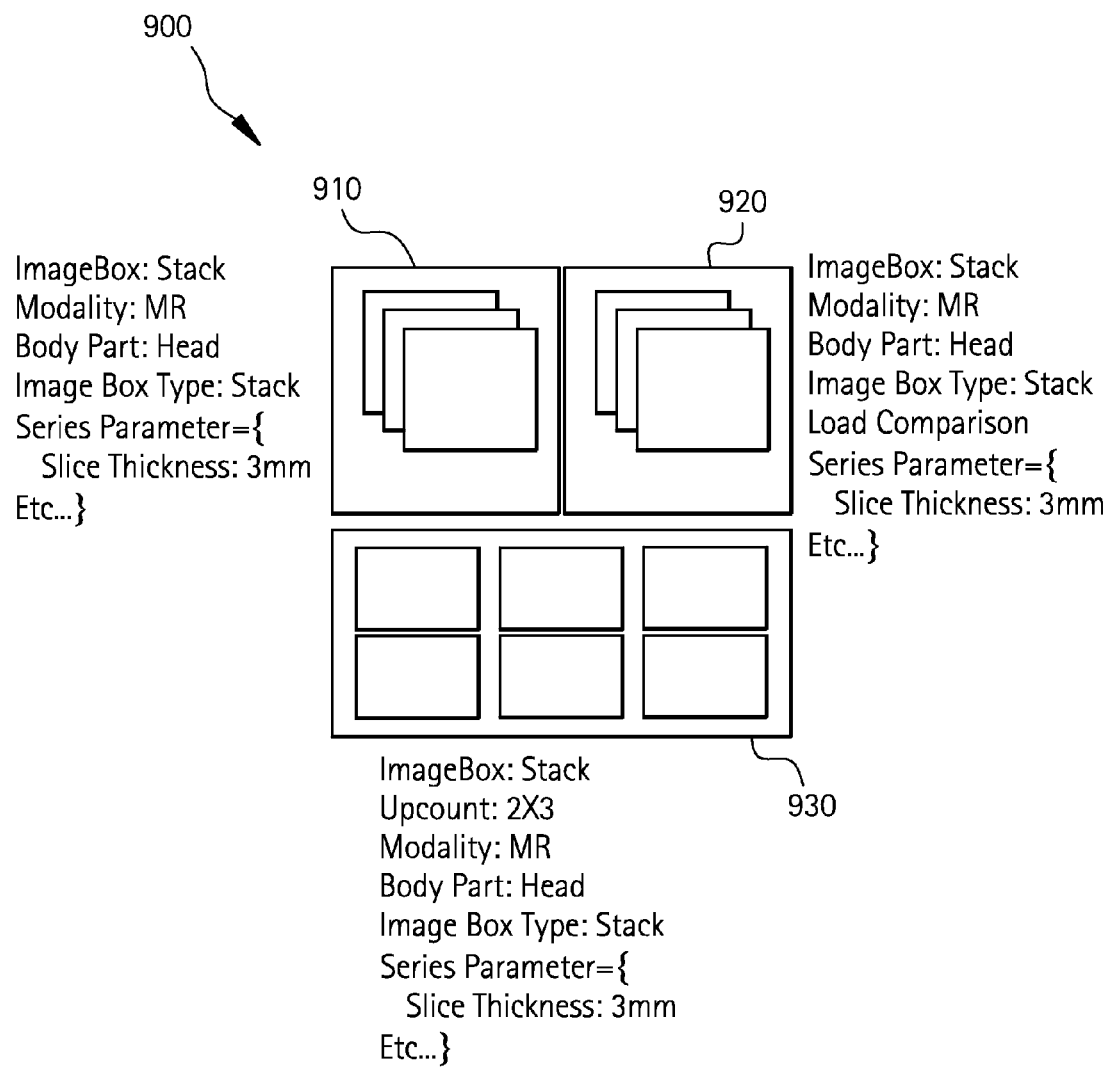

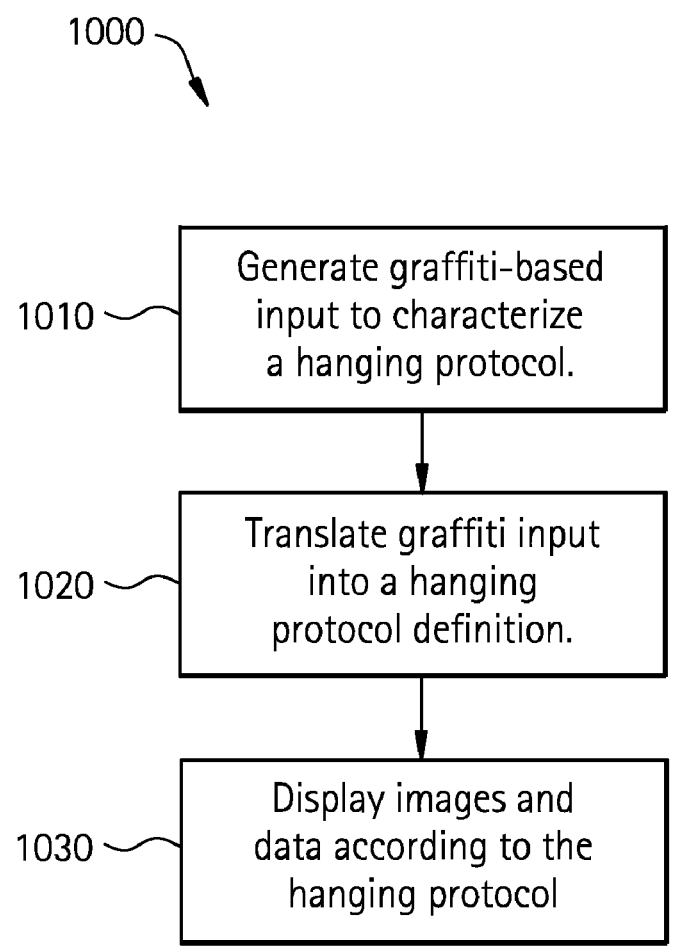

METHODS AND SYSTEMS FOR CREATION OF HANGING PROTOCOLS USING GRAFFITI-ENABLED DEVICES

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to improving healthcare application workflow. In particular, the present invention relates to use of gesture recognition to improve healthcare application workflow.

A clinical or healthcare environment is a crowded, demanding environment that would benefit from organization and improved ease of use of imaging systems, data storage systems, and other equipment used in the healthcare environment. A healthcare environment, such as a hospital or clinic, encompasses a large array of professionals, patients, and equipment. Personnel in a healthcare facility must manage a plurality of patients, systems, and tasks to provide quality service to patients. Healthcare personnel may encounter many difficulties or obstacles in their workflow.

In a healthcare or clinical environment, such as a hospital, a large number of employees and patients may result in confusion or delay when trying to reach other medical personnel for examination, treatment, consultation, or referral, for example. A delay in contacting other medical personnel may result in further injury or death to a patient. Additionally, a variety of distraction in a clinical environment may frequently interrupt medical personnel or interfere with their job performance. Furthermore, workspaces, such as a radiology workspace, may become cluttered with a variety of monitors, data input devices, data storage devices, and communication device, for example. Cluttered workspaces may result in efficient workflow and service to clients, which may impact a patient's health and safety or result in liability for a healthcare facility.

Data entry and access is also complicated in a typical healthcare facility. Speech transcription or dictation is typically accomplished by typing on a keyboard, dialing a transcription service, using a microphone, using a Dictaphone, or using digital speech recognition software at a personal computer. Such dictation methods involve a healthcare practitioner sitting in front of a computer or using a telephone, which may be impractical during operational situations. Similarly, for access to electronic mail or voice messages, a practitioner must typically use a computer or telephone in the facility. Access outside of the facility or away from a computer or telephone is limited.

Thus, management of multiple and disparate devices, positioned within an already crowded environment, that are used to perform daily tasks is difficult for medical or healthcare personnel. Additionally, a lack of interoperability between the devices increases delay and inconvenience associated with the use of multiple devices in a healthcare workflow. The use of multiple devices may also involve managing multiple logons within the same environment. A system and method for improving ease of use and interoperability between multiple devices in a healthcare environment would be highly desirable.

In a healthcare environment involving extensive interaction with a plurality of devices, such as keyboards, computer mousing devices, imaging probes, and surgical equipment, repetitive motion disorders often occur. A system and method that eliminates some of the repetitive motion in order to minimize repetitive motion injuries would be highly desirable.

Healthcare environments, such as hospitals or clinics, include clinical information systems, such as hospital information systems (HIS) and radiology information systems (RIS), and storage systems, such as picture archiving and communication systems (PACS). Information stored may include patient medical histories, imaging data, test results, diagnosis information, management information, and/or scheduling information, for example. The information may be centrally stored or divided at a plurality of locations. Healthcare practitioners may desire to access patient information or other information at various points in a healthcare workflow. For example, during surgery, medical personnel may access patient information, such as images of a patient's anatomy, that are stored in a medical information system. Alternatively, medical personnel may enter new information, such as history, diagnostic, or treatment information, into a medical information system during an ongoing medical procedure.

In current information systems, such as PACS, information is entered or retrieved using a local computer terminal with a keyboard and/or mouse. During a medical procedure or at other times in a medical workflow, physical use of a keyboard, mouse or similar device may be impractical (e.g., in a different room) and/or unsanitary (i.e., a violation of the integrity of an individual's sterile field). Re-sterilizing after using a local computer terminal is often impractical for medical personnel in an operating room, for example, and may discourage medical personnel from accessing medical information systems. Thus, a system and method providing access to a medical information system without physical contact would be highly desirable to improve workflow and maintain a sterile field.

Imaging systems are complicated to configure and to operate. Often, healthcare personnel may be trying to obtain an image of a patient, reference or update patient records or diagnosis, and ordering additional tests or consultation. Thus, there is a need for a system and method that facilitate operation and interoperability of an imaging system and related devices by an operator.

In many situations, an operator of an imaging system may experience difficulty when scanning a patient or other object using an imaging system console. For example, using an imaging system, such as an ultrasound imaging system, for upper and lower extremity exams, compression exams, carotid exams, neo-natal head exams, and portable exams may be difficult with a typical system control console. An operator may not be able to physically reach both the console and a location to be scanned. Additionally, an operator may not be able to adjust a patient being scanned and operate the system at the console simultaneously. An operator may be unable to reach a telephone or a computer terminal to access information or order tests or consultation. Providing an additional operator or assistant to assist with examination may increase cost of the examination and may produce errors or unusable data due to miscommunication between the operator and the assistant. Thus, a method and system that facilitates operation of an imaging system and related services by an individual operator would be highly desirable.

Additionally, image volume for acquisition and radiologist review continues to increase. PACS imaging tools have increased in complexity as well. Thus, interactions with standard input devices (e.g., mouse, trackball, etc.) have become increasingly more difficult. Radiologists have complained about a lack of ergonomics with respect to standard input devices, such as a mouse, trackball, etc. Scrolling through large datasets by manually cine-ing or scrolling, repeated mouse movements, and other current techniques have resulted in carpel tunnel syndrome and other repetitive stress syndromes. Radiologists have not been able to leverage other, more ergonomic input devices (e.g., joysticks, video editors, game pads, etc.), because the devices are not custom configurable for PACS and other healthcare application interactions.

Tablets, such as Wacom tablets, have been used in graphic arts but have no current applicability or interactivity with other applications, such as healthcare applications. Handheld devices, such as personal digital assistants or pocket PCs, have been used for general scheduling and note-taking but have not been adapted to healthcare use or interaction with healthcare application workflow.

Devices facilitating gesture-based interaction typically afford motion-based interactions whereby a user writes or motions a character or series of characters that corresponds to a specific software function. Gesture recognition algorithms typically attempt to recognize a pattern or character gestured by the user. Typical gesture recognition systems focus on recognition of the gestured character alone. In the case of an image magnify, a user must gesture, for example, the letter "z." The gesture-enabled image processing or display system responds by generically zooming the image. Unfortunately, the system is unaware of a specific level of zoom that the user is requesting from this gesture based interaction. If a user would like to further zoom in, he/she must repeatedly gesture the letter "z" to zoom to the appropriate level. Such repetition may not only be time consuming, but may also be a physical drain on the user.

As discussed above, clinicians, especially surgeons, are challenged with maintaining a sterile environment when using conventional computer devices such as a mouse and keyboard. Several approaches have been proposed to address the desire to maintain a sterile clinical environment, such as use of a sterile mouse/keyboard, gesture recognition, gaze detection, a thin-air display, voice command, etc. However, problems remain with these approaches. Voice command and control appears to be a viable solution but, due to proximity issues and presence of multiple people in an operating room providing confusion and interference, use of voice command and control may not be very practical or effective. Use of a thin-air display still suffers from very complex interaction with computer(s) in the clinical environment.

Radiologists traditionally want less and more intuitive interaction with computers for using PACS applications. In most cases, interaction problems are compounded by poor graphical user interfaces for functions such as zooming, cine, window scroll (which may involve a more continuous interaction), etc. In most cases, radiologists use a regular mouse or a scroll mouse and experimentally attempt to vary the speed/velocity of scroll/cine, etc.

A graffiti character set may be used with a user interface to allow a radiologist to directly interact with PACS by drawing/writing graffiti characters/gestures on an image and thereby provide a user interface without a separate graphical user interface. However, for zooming, scrolling or cine, users will have to write the corresponding characters multiple times, adding complexity to the process.

A hanging protocol is a set of display rules for presenting, formatting and otherwise organizing images on a display device of a PACS workstation, for example. A display rule is a convention for presenting one or more images in a particular temporal and/or spatial layout or sequence. For example, a hanging protocol may include a set of computer-readable instructions (or display rules, for example) that direct a computer to display a plurality of images in certain locations on a display device and/or display the plurality of images in a certain sequence or order. In another example, a hanging protocol may include a set of computer-readable instructions that direct a computer to place a plurality of images in multiple screens and/or viewports on a display device. In general, a hanging protocol may be employed to present a plurality of images for a diagnostic examination of a patient anatomy featured in the images.

A hanging protocol may direct, for example, a PACS workstation to display an anterior-posterior ("AP") image adjacent to a lateral image of the same anatomy. In another example, a hanging protocol may direct PACS workstation to display the AP image before displaying the lateral image. In general, a hanging protocol dictates the spatial and/or temporal presentation of a plurality of images at PACS workstation.

A hanging protocol differs from a default display protocol ("DDP"). In general, a DDP is a default workflow that applies a series of image processing functions to image data. The image processing functions are applied to the image data in order to present an image (based on the image data) to a user. The image processing functions alter the appearance of image data. For example, an image processing function may alter the contrast level of an image.

DDPs typically include processing steps or functions that are applied before any diagnostic examination of the images. For example, processing functions may be applied to image data in order to enhance features within an image (based on the image data). Such processing functions can include any software-based application that may alter a visual appearance or representation of image data. For example, a processing function can include any one or more of flipping an image, zooming in an image, panning across an image, altering a window and/or level setting in a representation of the image data, and altering a contrast and/or brightness setting in a representation of the image data.

DDPs are usually based on a type of imaging modality used to obtain the image data. For example, image data obtained with a C-arm imaging device in general or a particular C-arm imaging device may have a same or similar DDP applied to the image data. In general, a DDP attempts to present image data in a manner most useful to many users. Conversely, applying a hanging protocol to image data does not alter the appearance of an image (based on the image data), but instead dictates how the image(s) is(are) presented, as described above.

Hanging protocols are currently created using one or more of a mouse, keyboard and graphical user interface ("GUI") components. Such components are used to specify an image box type (for example, stack, sheet, volume, etc.). The components are used to specify parameters for image sets to be loaded in the image box. The components are also used to set image view presets and/or presentation state, for example. Current hanging protocol creation involves multiple input devices, and a user must switch between keyboard and mouse to create a hanging protocol.

Thus, there is a need for systems and methods to improve healthcare workflow using gesture recognition and other interaction. Furthermore, systems and methods for more streamlined gesture-based control would be highly desirable. Systems and methods for improved creation and management of hanging protocols would also be highly desirable.

BRIEF SUMMARY OF THE INVENTION

Certain embodiments of the present invention provide methods and systems for hanging protocol generation using gesture recognition.

Certain embodiments provide a method for creating a hanging protocol based on gesture input in a clinical environment. The method includes specifying a hanging protocol specification using gesture-based input. The method also includes translating the gesture-based input into a hanging protocol. The method further includes facilitating display of clinical information based on the hanging protocol.

Certain embodiments provide a computer-readable medium having a set of instructions for execution on a computer. The computer-readable medium includes a sensor routine for detecting gesture-based input for a hanging protocol specification. The computer-readable medium also includes a translation routine for translating the gesture-based input to a corresponding hanging protocol definition.

Certain embodiments provide a gesture detection system. The system includes a sensor surface configured to detect gesture-based input made on the sensor surface. The gesture-based input specifies a hanging protocol layout. The system also includes a processor configured to identify the gesture-based input and translate the gesture to a corresponding hanging protocol definition for display of image and clinical data.

BRIEF DESCRIPTION OF SEVERAL VIEWS OF THE DRAWINGS

FIG. 9 illustrates translation of graffiti input to a hanging protocol in accordance with an embodiment of the present invention.

FIG. 10 illustrates a flow diagram for a method for graffiti-based hanging protocol creation in accordance with an embodiment of the present invention.

Figure 1:
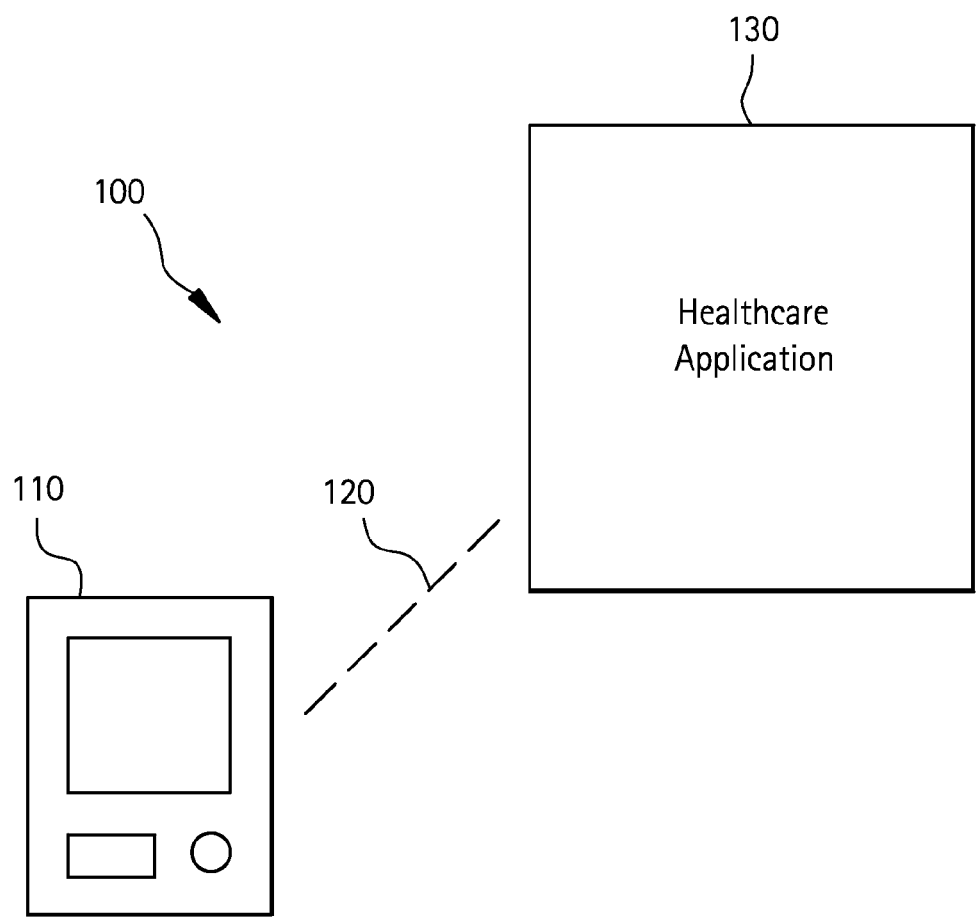
FIG. 1 illustrates an information input and control system for healthcare applications and workflow used in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates an information input and control system 100 for healthcare applications and workflow used in accordance with an embodiment of the present invention. The system 100 includes an interface 110, a communication link 120, and a healthcare application 130. The components of the system 100 may be implemented in software, hardware, and/or firmware, for example. The components of the system 100 may be implemented separately and/or integrated in various forms.

The communication link 120 serves to connect the interface 110 and the healthcare application 130. The link 120 may a cable or other wire-based link, a data bus, a wireless link, an infrared link, and/or other data connection, for example. For example, the communication link 120 may be a USB cable or other cable connection. Alternatively or in addition, the communication link 120 may include a Bluetooth, WiFi, 802.11, or other wireless communication device, for example. The communication link 120 and interface 110 allow a user to input and retrieve information from the healthcare application 130 and to execute functions at the healthcare application 130 and/or other remote system.

Figure 2:
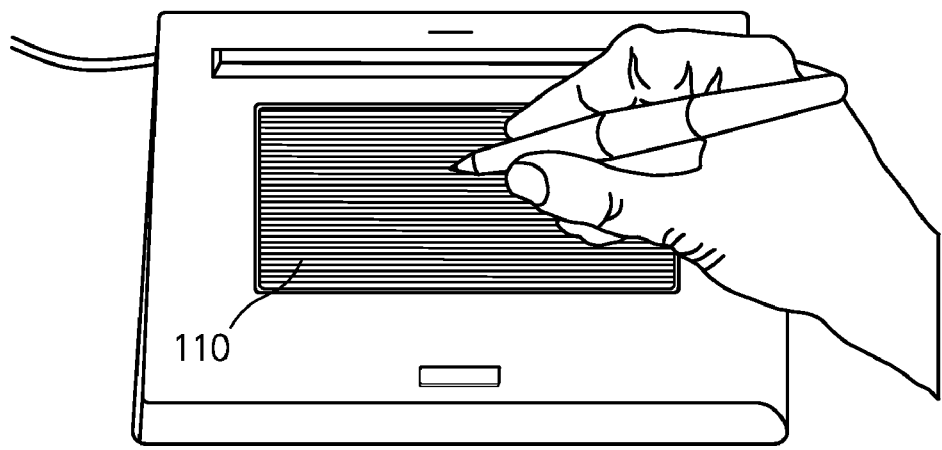
FIG. 2 shows an example of an interface and graffiti used in accordance with an embodiment of the present invention.
Figure 2:
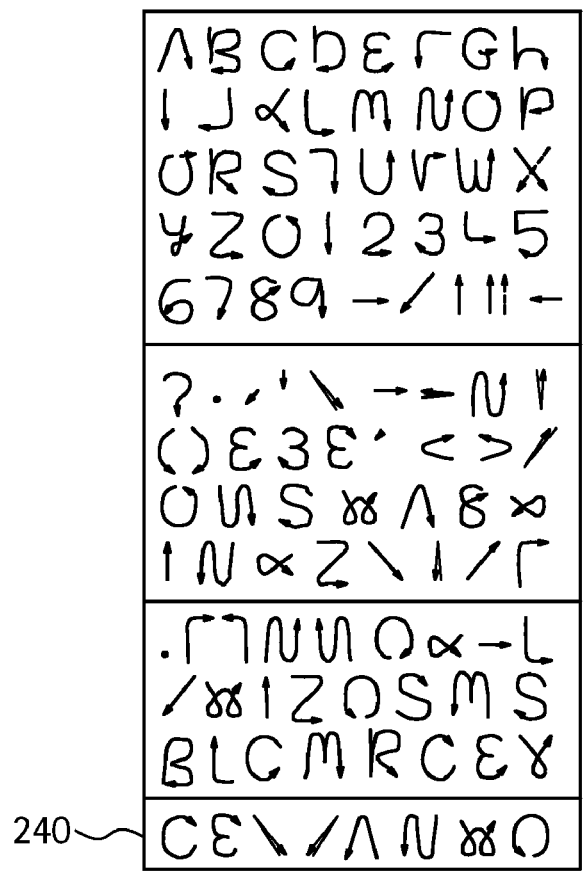

The interface 110 is a user interface, such as a graphical user interface, that allows a user to input information, retrieve information, activate application functionality, and/or otherwise interaction with the healthcare application 130. As illustrated in FIG. 2, the interface 110 may be a tablet-based interface with a touchscreen capable of accepting stylus, pen, keyboard, and/or human touch input, for example. For example, the interface 110 may be used to drive healthcare applications and may serve as an interaction device and/or as a display to view and interact with screen elements, such as patient images or information. The interface 110 may execute on and/or be integrated with a computing device, such as a tablet-based computer, a personal digital assistant, a pocket PC, a laptop, a notebook computer, a desktop computer, a cellular phone, and/or other handheld or stationary computing system. The interface 110 facilitates wired and/or wireless communication and provides audio, video and or other graphical output, for example.

The interface 110 and communication link 120 may include multiple levels of data transfer protocols and data transfer functionality. The interface 110 and communication link 120 may support a plurality of system-level profiles for data transfer, such as an audio/video remote control profile, a cordless telephony profile, an intercom profile, an audio/video distribution profile, a headset profile, a hands-free profile, a file transfer protocol, a file transfer profile, and/or an imaging profile. The communication link 120 and the interface 110 may be used to support data transmission in a personal area network (PAN) or other network.

In an embodiment, graffiti-based stylus or pen interactions, such as graffiti 240 shown in FIG. 2, may be used to control functionality at the interface 110 and/or healthcare application 130 via the interface 110 and communication link 120. Graffiti and/or other strokes may be used to represent and/or trigger one or more commands, command sequences, workflow, and/or other functionality at the interface 110 and/or healthcare application 130, for example. That is, a certain movement or pattern of a cursor displayed on the interface 110 corresponds to or triggers a command or series of commands at the interface 110 and/or healthcare application 130, for example. Interactions triggered by graffiti and/or other gesture or stroke may be customized for healthcare application(s) and/or for particular user(s) or group(s) of user(s), for example. Graffiti/stroke(s) may be implemented in a variety of languages instead of or in addition to English, for example. Graffiti interactions or shortcuts may be mapped to keyboard shortcuts, program macros, and/or specific interactions, for example.

The healthcare application 130 may be a healthcare software application, such as an image/data viewing application, an image/data analysis application, an annotation and/or reporting application, and/or other patient and/or practice management application. The healthcare application 130 may include hardware, such as a Picture Archiving and Communication System (PACS) workstation, advantage workstation (AW), PACS server, image viewer, personal computer, workstation, server, patient monitoring system, imaging system, or other data storage or processing device, for example. The interface 110 may be used to manipulate functionality at the healthcare application 130 including but not limited to image zoom (e.g., single or multiple zoom), application and/or image reset, display window/level setting, cine/motion, magic glass (e.g., zoom eyeglass), image/document annotation, image/document rotation (e.g., rotate left, right, up, down, etc.), image/document flipping (e.g., flip left, right, up, down, etc.), undo, redo, save, close, open, print, pause, indicate significance, etc. Images and/or information displayed at the healthcare application 130 may be affected via the interface 110 via a variety of operations, such as pan, cine forward, cine backward, pause, print, window/level, etc.

In an embodiment graffiti or other gesture or indication may be customizable and configurable by a user and/or administrator, for example. A user may create one or more strokes and/or functionality corresponding to one or more strokes, for example. In an embodiment, the system 100 may provide a default configuration of strokes and corresponding functionality. A user, such as an authorized user, may create his or her own graffiti and/or functionality, and/or may modify default configuration of functionality and corresponding graffiti, for example. A user may combine a sequence or workflow of actions/functionality into a single gesture/graffiti, for example.

In an embodiment, a password or other authentication, such as voice or other biometric authentication, may also be used to establish a connection between the interface 110 and the healthcare application 130 via the communication link 120. Once a connection has been established between the interface 110 and the healthcare application 130, commands may be passed between interface 110 and the healthcare application 130 via the communication link 120.

In operation, for example, a radiologist, surgeon or other healthcare practitioner may use the interface 110 in an operating room. The surgeon may request patient data, enter information about the current procedure, enter computer commands, and receive patient data using the interface 110. To request patient data or enter computer commands, the surgeon "draws" or otherwise indicates a stroke or graffiti motion on the interface 110. The request or command is transmitted from the interface 110 to the healthcare application 130 via the communication link 120. The healthcare application 130 then executes command(s) received from the interface 110. If the surgeon requests patient information, the healthcare application 130 retrieves the information. The healthcare application 130 may then transmit the patient information to the interface 110 via the communication device 120. Alternatively or in addition, the information may be displayed at the healthcare application 130. Thus, requested information and/or function result may be displayed at the interface 110, healthcare application 130, and/or other display, for example.

In an embodiment, when a surgeon or other healthcare practitioner sterilizes before a procedure, the interface 110 may be sterilized as well. Thus, a surgeon may use the interface 110 in a more hygienic environment to access information or enter new information during a procedure, rather than touch an unsterile keyboard or mouse for the healthcare application 130.

In certain embodiments, a user may interact with a variety of electronic devices and/or applications using the interface 110. A user may manipulate functionality and/or data at one or more applications and/or systems via the interface 110 and communication link 120. The user may also retrieve data, including image(s) and related data, from one or more system(s) and/or application(s) using the interface 110 and communication link 120.

For example, a radiologist carries a wireless-enabled tablet PC. The radiologist enters a radiology reading room to review or enter image data. A computer in the room running a healthcare application 130 recognizes the tablet PC interface 110 via the communication link 120. That is, data is exchanged between the tablet PC interface 110 and the computer via a wireless communication link 120 to allow the interface 110 and the healthcare application 130 to synchronize. The radiologist is then able to access the healthcare application 130 via the tablet PC interface 110 using strokes/gestures at the interface 110. The radiologist may view, modify, and print images and reports, for example, using graffiti via the communication link 120 and tablet PC interface 110. The interface 110 enables the radiologist to eliminate excess clutter in a radiology workspace by replacing use of a telephone, keyboard, mouse, etc. with the interface 110. The interface 110 and communication link 120 may simplify interaction with a plurality of applications/devices and simplify a radiologist's workflow through use of a single interface point and simplified gestures/strokes representing one or more commands/functions.

In certain embodiments, interface strokes may be used to navigate through clinical applications such as a picture archiving and communication system (PACS), a radiology information system (RIS), a hospital information system (HIS), and an electronic medical record (EMR). A user's gestures/graffiti may be used to execute commands in a system, transmit data to be recorded at the system, and/or retrieve data, such as patient reports or images, from the system.

In certain embodiments, the system 100 may include voice command and control capability. For example, spoken words may be converted to text for storage and/or display at a healthcare application 130. Additionally, text at the healthcare application 130 may be converted to audio for playback to a user at the interface 110 via the communication link 120. Dictation may be facilitated using voice recognition software on the interface 110 and/or the healthcare application 130. Translation software may allow dictation as well as playback of reports, lab data, examination notes, and image notes, for example. Audio data may be reviewed in real-time in stereo sound via the system 100. For example, a digital sound file of a patient heartbeat may be reviewed by a physician remotely through the system 100.

The communication link 120 and interface 110 may also be used to communicate with other medical personnel. Certain embodiments may improve reporting by healthcare practitioners and allow immediate updating and revising of reports using gestures and/or voice commands. Clinicians may order follow-up studies at a patient's bedside or during rounds without having to locate a mouse or keyboard. Additionally, reports may be signed electronically, eliminating delay or inconvenience associated with a written signature.

Figure 3:
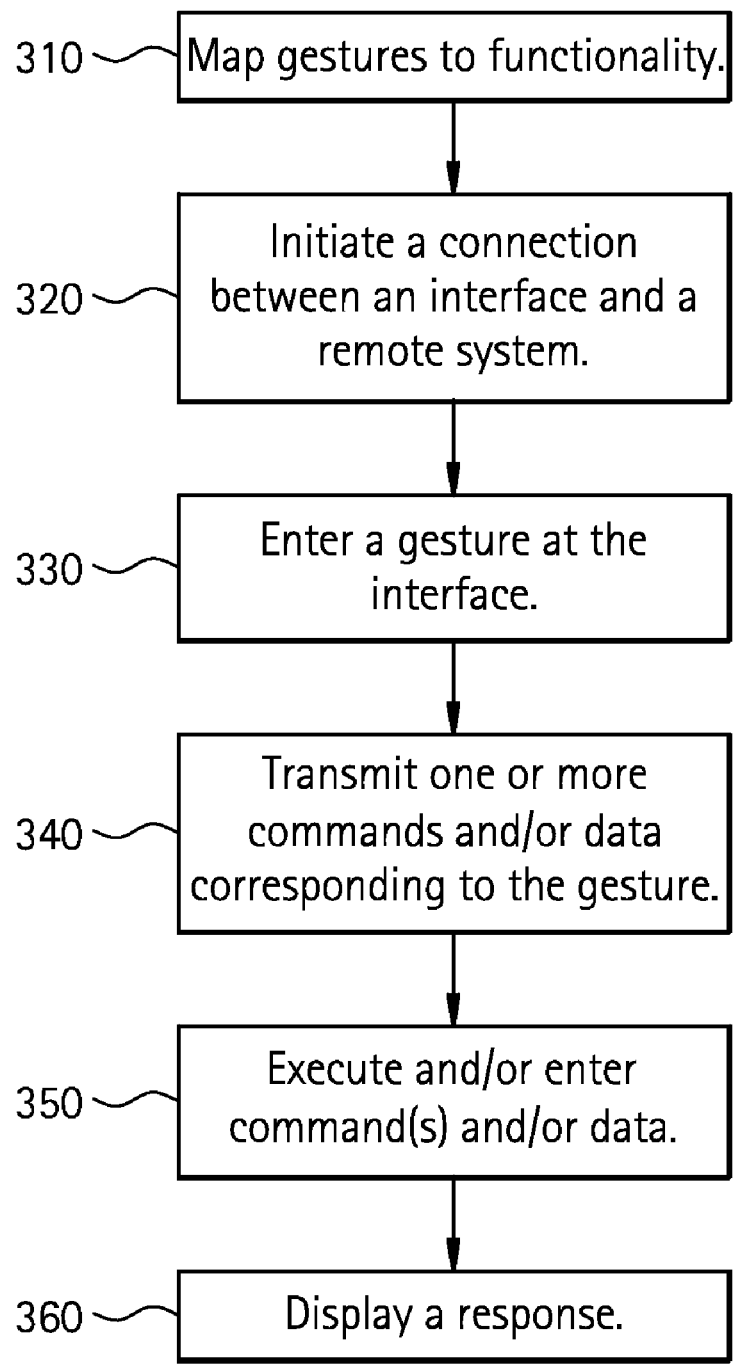
FIG. 3 illustrates a flow diagram for a method for gesture-based interaction with a healthcare application in accordance with an embodiment of the present invention.

FIG. 3 illustrates a flow diagram for a method 300 for gesture-based interaction with a healthcare application in accordance with an embodiment of the present invention. First, at step 310, one or more gestures are mapped to one or more functionality. For example, a gesture indicating a rudimentary representation of an anatomy, such as a breast, may retrieve and display a series of breast exam images for a patient. Other exemplary gestures and corresponding functionality may include, but are not limited to, a diagonal line from left to right to zoom in on an image, a diagonal line from right to left to zoom out on an image, a counterclockwise semi-circle to rotate and 3D reformat an image counterclockwise, a clockwise semi-circle to rotate and 3D reformat an image clockwise, a series of circles may indicate a virtual colonoscopy sequence, and/or a gesture indicating a letter "B" may correspond to automatic bone segmentation in one or more images.

In certain embodiments, a series or workflow of functionality may be combined into a signal stroke or gesture. For example, a stroke made over an exam image may automatically retrieve related historical images and/or data for that anatomy and/or patient. A stroke made with respect to an exam may automatically cine through images in the exam and generate a report based on those images and analysis, for example. A stroke may be used to provide structured and/or standard annotation in an image and/or generate a report, such as a structured report, for image analysis. Strokes may be defined to correspond to standard codes, such as Current Procedural Terminology (CPT), International Classification of Diseases (ICD), American College of Radiology (ACR), Digital Imaging and Communications in Medicine (DICOM), Health Level Seven (HL7), and/or American National Standards Institute (ANSI) codes, and/or orders, for example. Strokes may be defined to correspond to any functionality and/or series of functionality in a healthcare application, for example.

In an embodiment, a default configuration of strokes and functionality may be provided. In an embodiment, the default configuration may be modified and/or customized for a particular user and/or group of users, for example. In an embodiment, additional stroke(s) and/or functionality may be defined by and/or for a user and/or group of users, for example.

At step 320, a connection is initiated between an interface, such as interface 110, and a remote system, such as healthcare application 130. Data packets are transmitted between a remote system and an interface to establish a communication link between the remote system and the interface. The communication link may also be authenticated using voice identification or a password, for example. The connection may be established using a wired or wireless communication link, such as communication link 120. After the communication link has been established, a user may interact with and/or affect the remote system via the interface.

Next, at step 330, a user gestures at the interface. For example, the user enters graffiti or other stroke using a pen, stylus, finger, touchpad, etc., at an interface screen. In an embodiment, a mousing device may be used to gesture on an interface display, for example. The gesture corresponds to a desired action at the remote system. The gesture may also correspond to a desired action at the interface, for example. A gesture may correspond to one or more commands/actions for execution at the remote system and/or interface, for example.

Then, at step 340, a command and/or data corresponding to the gesture is transmitted from the interface to the remote system. If the gesture were related to functionality at the interface, then the gesture is simply translated into a command and/or data at the interface. In certain embodiments, a table or other data structure stores a correlation between a gesture and one or more commands, actions, and/or data which are to be input and/or implemented as a result of the gesture. When a gesture is recognized by the interface, the gesture is translated to the corresponding command and/or data for execution by a processor and/or application at the interface and/or remote system.

At step 350, the command and/or data is executed and/or entered at the remote system. In an embodiment, if a command and/or data were intended for local execution at the interface, then the command and/or data is executed and/or entered at the interface. Data may be entered, retrieved, and/or modified at the interface, such as the interface 110, and/or the remote system, such as the healthcare application 130, based on the gesture, for example. An application and/or functionality may be executed at the remote system and/or interface in response to the gesture, for example. In an embodiment, a plurality of data and/or functionality may be executed at the remote system and/or interface in response to a gesture, for example.

Next, at step 360, a response is displayed. A response may be displayed at the interface and/or at the remote system, for example. For example, data and/or application results may be displayed at the interface and/or remote system as a result of command(s) and/or data executed and/or entered in response to a gesture. A series of images may be shown and/or modified, for example. Data may be entered into an image annotation and/or report, for example. One or more images may be acquired, reviewed, and/or analyzed according to one or more gestures, for example. For example, a user using a pen to draw a letter "M" or other symbol on an interface display may result in magnification of patient information and/or images on an interface and/or remote system display.

In certain embodiments, graffiti/gesture based interactions can be used as symbols for complex, multi-step macros in addition to 1-to-1 keyboard or command mappings. A user may be afforded greater specificity by modifying a graffiti/gesture-based command/action based on a size and position of character/gesture performed. For example, a level of zoom that a user desires with respect an image can be determined by the size of the character "z" he/she gestures on the image. If he/she is looking to zoom in to a medium degree, he/she gestures a medium sized "z", and so forth. The position of the gesture may also modify a gesture. For example, zooming in on a lower left quadrant of an image window may allow the user to affect and zoom in on the lower quadrant of the image, and so forth.

Figure 4A:
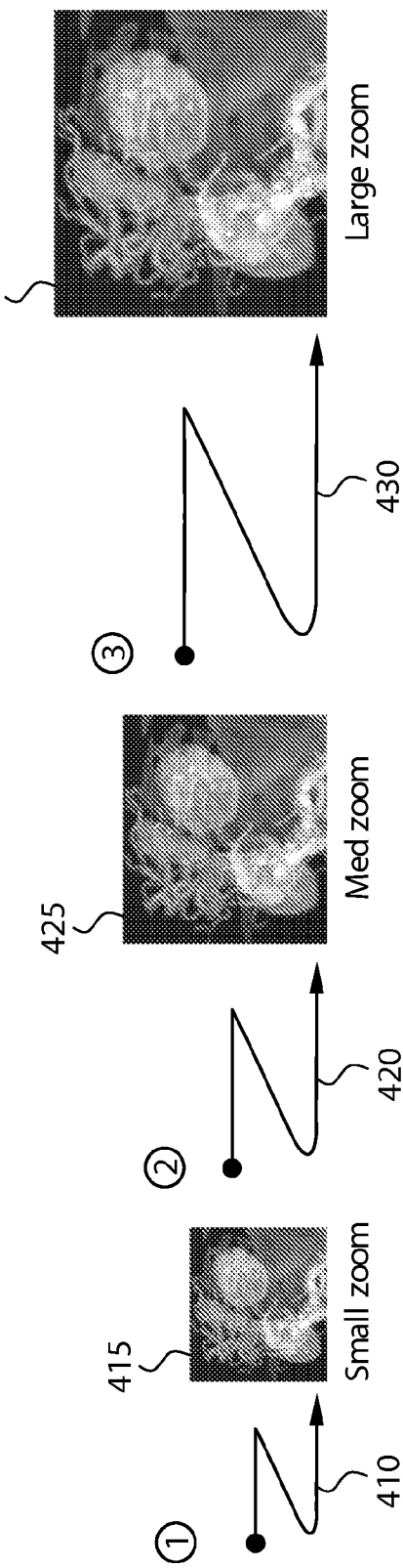
FIGS. 4A-4B depict examples demonstrating how a size and/or a position of a gesture can affect a size of a corresponding action according to embodiments of the present invention.

FIG. 4A depicts examples demonstrating how a size of a gesture can affect a size of a corresponding action. As shown in the first panel of FIG. 4A, the smaller "z" gesture 410 results in a smaller zoom effect 415. A medium-sized "z" gesture 420 results in a medium-sized zoom effect 425. A larger "z" gesture 430 in the third panel produces a proportionally larger zoom factor 435.

Figure 4B:
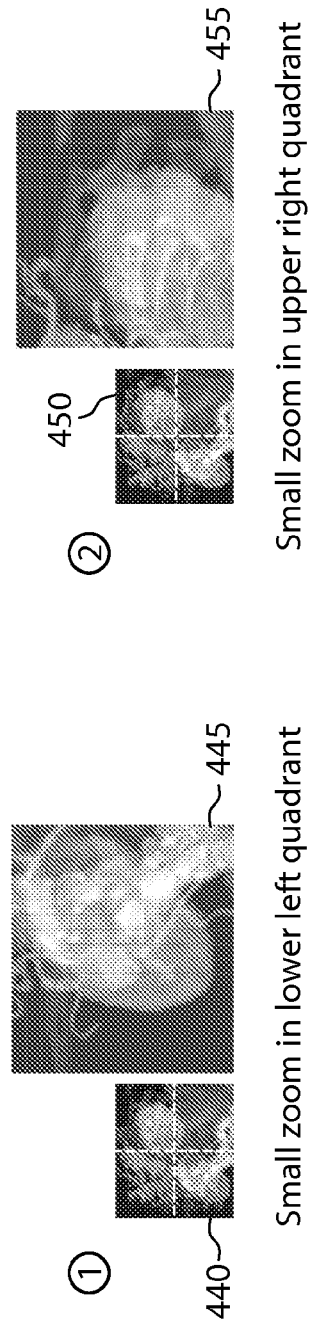

FIG. 4B depicts examples demonstrating how a position of a gesture can affect a relative position of an image with regard to a certain gesture interaction. As shown in FIG. 4B, a small zoom or "z" gesture 440 in the lower left quadrant of an image results in a small zoom of the lower left quadrant of the image 445. In the second panel of FIG. 4B, a small zoom gesture 450 in the upper right quadrant of the image results in a small zoom of the upper right quadrant of the image 455.

Figure 5:
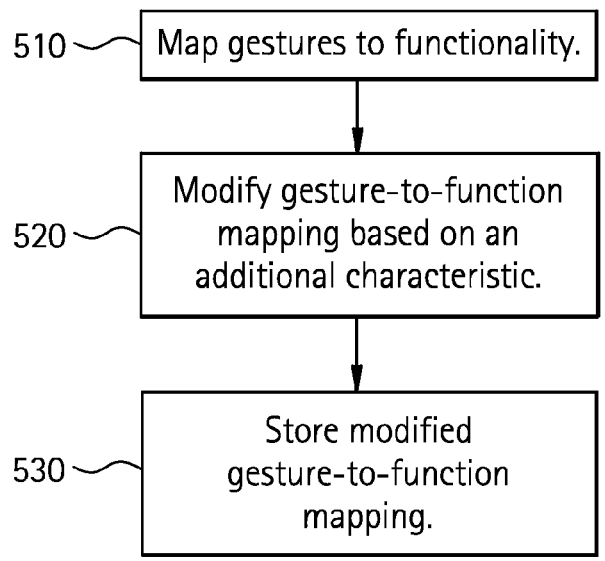
FIG. 5 illustrates a flow diagram for a method for associating a gesture with a healthcare application function in accordance with an embodiment of the present invention.

FIG. 5 illustrates a flow diagram for a method 500 for associating a gesture with a healthcare application function in accordance with an embodiment of the present invention. At step 510, a gesture is mapped to a healthcare application function. For example, the gesture or character "z" is mapped to a zoom or magnify command in an image processing or review application.

At step 520, the gesture-to-function mapping is modified based on an additional characteristic associated with the gesture/graffiti. For example, a size of a gestured "z" is mapped to a certain degree of zoom (e.g., a "normal"-sized "z" corresponds to a certain degree of zoom while a smaller "z" and a larger gestured "z" correspond to an order of magnitude smaller and larger zoom of an image, respectively). As another example, a position of a gestured "z" is mapped to a certain area of zoom (e.g., a gestured "z" in a lower left quadrant of an image corresponds to a zoom of the lower left quadrant of the image and a gestured "z" in an upper left quadrant of an image corresponds to a zoom of the upper left quadrant of the image). In certain embodiments, a plurality of characteristics (e.g., size and position) may be combined to modify a gesture-to-function mapping. Additionally, although a "z" gesture and an image zoom command have been used above, it is understood that use of "z" and zoom is for purposes of illustration only and many other gesture-based commands (e.g., "c" to cine a series of images, "m" to magnify an image, "s" for segmentation, "b" for bone segmentation, "w" to adjust window level, "r" to reset, drag and drop gestures, etc.) may be implemented according to embodiments of the present invention.

At step 530, the modified gesture-to-function mapping is stored for future use. In certain embodiments, mappings may be later modified by a user and/or tailored for a particular user and/or group of users according to a profile and/or single-session modification. In certain embodiments, mappings may be dynamically created for a single-session use and/or dynamically created and saved for further future use, for example.

Certain embodiments enhance a graffiti- or gesture-based clinical system, such as a PACS system, using pressure a user applies on a graffiti pen or other gesturing instrument and/or a display or other sensor to adjust a characteristic or parameter of the gesture-based command, such as a velocity or repetition of a zoom, cine or scroll command. As an example, a user may want to cine through a stack of images. The user begins by writing or gesturing a character (e.g., the letter "c") to start a manual cine. If the user wants to scroll through the image faster, the user applies more pressure to the gesturing instrument, such as a graffiti pen or stylus. In certain embodiments, if the user applies less pressure to the instrument, scrolling slows down. The action stops when the user applies no pressure. The same process applies to any continuous input need for scrolling or zooming or other operations, for example.

Figure 6:
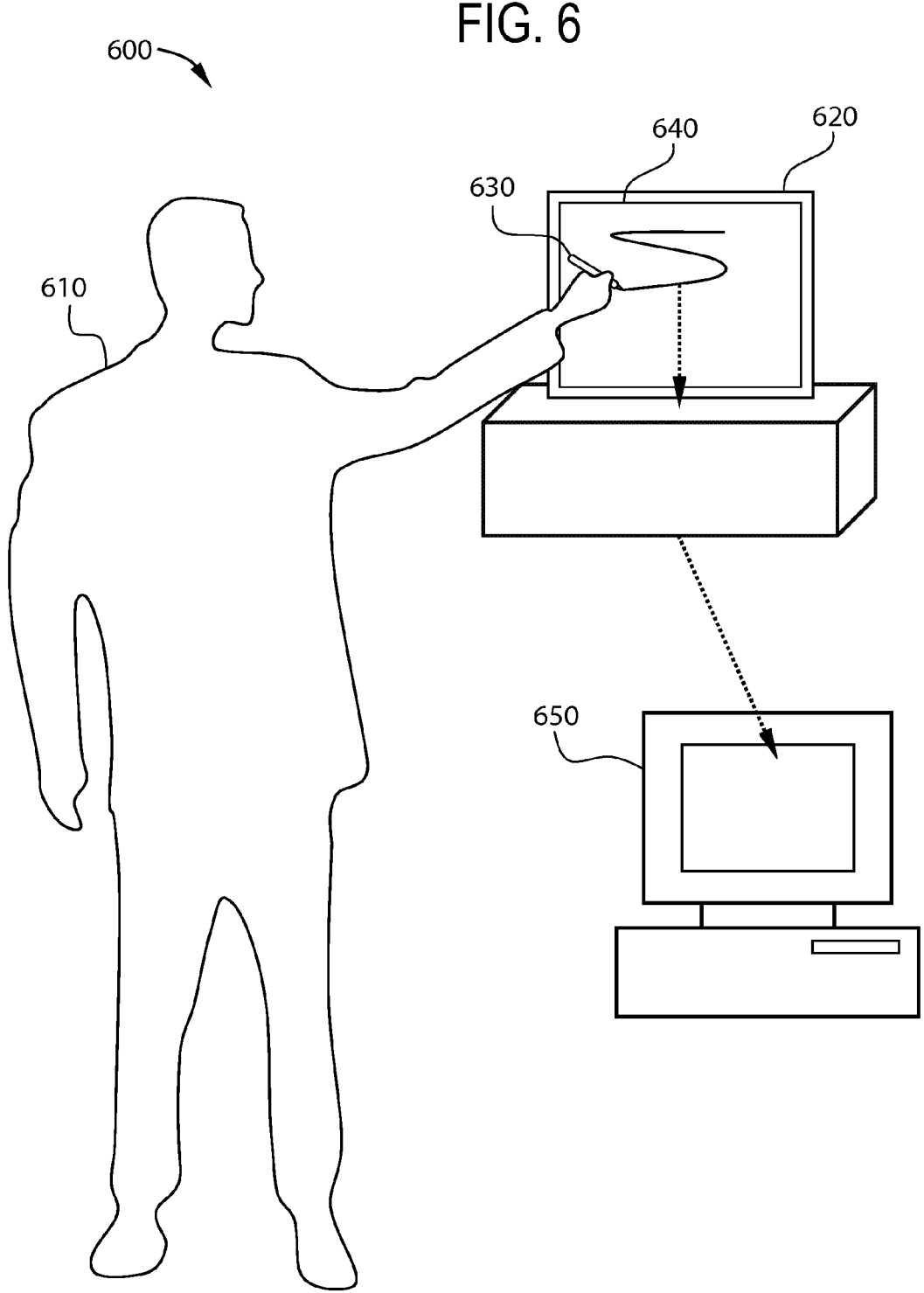
FIG. 6 illustrates a pressure-sensitive gesture-based interaction system in accordance with an embodiment of the present invention.

FIG. 6 illustrates a pressure-sensitive gesture-based interaction system 600 in accordance with an embodiment of the present invention. FIG. 6 shows a clinician zooming on the image with graffiti with pressure sensor. As shown in FIG. 6, a clinician 610 gestures to form a graffiti character 640 on a display 620 using an instrument 630. For example, the clinician 610 gestures to form a "z" on the display 620 using a stylus. The display 620 includes one or more sensors, such as a touch sensor overlaying and/or integrated with the display surface, to detect gestures made on the display 620. The sensor(s) and display 620 transmit detected gestures, such as a gestured "z", to a processing unit 650. The processing unit 650 may be integrated with the display 620, integrated with a clinical information system, such as a PACS, RIS, HIS, etc., and/or implemented separately in hardware, firmware and/or software, for example.

The processing unit 650 receives the gesture information and translates the gesture to healthcare application functionality. For example, the processing unit 650 receives information representing a gestured "z", as shown in FIG. 6, and maps the "z" gesture to a zoom command. The processing unit 650 may also detect a degree of pressure applied by the user 610 to the instrument 630 and/or to the display 620. The degree of pressure may be used to modify the gesture-to-command mapping, for example. For example, a degree of pressure on the stylus corresponds to a degree of zoom applied to the displayed image (e.g., for each degree of increased pressure, zooming in on the image is increased). The processing unit 650 then transmits the zoom command to a healthcare application, such as a PACS image review application.

Figure 7:
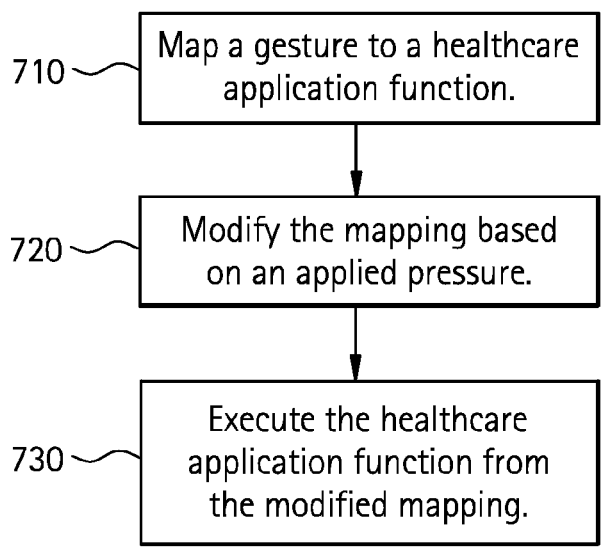
FIG. 7 illustrates a flow diagram for a method for associating a pressure with a gesture to execute a healthcare application function in accordance with an embodiment of the present invention.

FIG. 7 illustrates a flow diagram for a method 700 for associating a pressure with a gesture to execute a healthcare application function in accordance with an embodiment of the present invention. At step 710, a gesture made using a gesture instrument is mapped to a healthcare application function. For example, the gesture or character "z" made using a pen, stylus or other detectable instrument is mapped to a zoom or magnify command in an image processing or review application.

At step 720, the gesture-to-function mapping is modified based on pressure applied to the instrument and/or to the display by the user when making the gesture/graffiti. For example, a relative amount of pressure (e.g., compared to a "normal" or no excess amount of pressure) applied to the instrument and/or to the display when making the gestured "z" is mapped to a certain degree of zoom (e.g., a normal or normalized degree of pressure corresponds to a certain degree of zoom while a smaller degree of pressure and a larger degree of pressure made when gesturing "z" correspond to an order of magnitude smaller and larger zoom of an image, respectively). In certain embodiments, a plurality of characteristics may be combined to modify a gesture-to-function mapping. Additionally, although a "z" gesture and an image zoom command have been used above, it is understood that use of "z" and zoom is for purposes of illustration only and many other gesture-based commands (e.g., "c" to cine a series of images, "m" to magnify an image, "s" for segmentation, "b" for bone segmentation, "w" to adjust window level, "r" to reset, drag and drop gestures, etc.) may be implemented according to embodiments of the present invention.

At step 730, the modified gesture-to-function mapping is executed and a result displayed to the user. In certain embodiments, mappings may be later modified by a user and/or tailored for a particular user and/or group of users according to a profile and/or single-session modification. In certain embodiments, mappings may be dynamically created for a single-session use and/or dynamically created and saved for further future use, for example.

Certain embodiments use graffiti-enabled display devices to create and/or manage hanging protocols on a PACS client workstation and/or other terminal where a user can use graffiti handwriting technology along with a display device to draw a hanging protocol layout and write/select image box type and parameters, for example.

Figure 8:
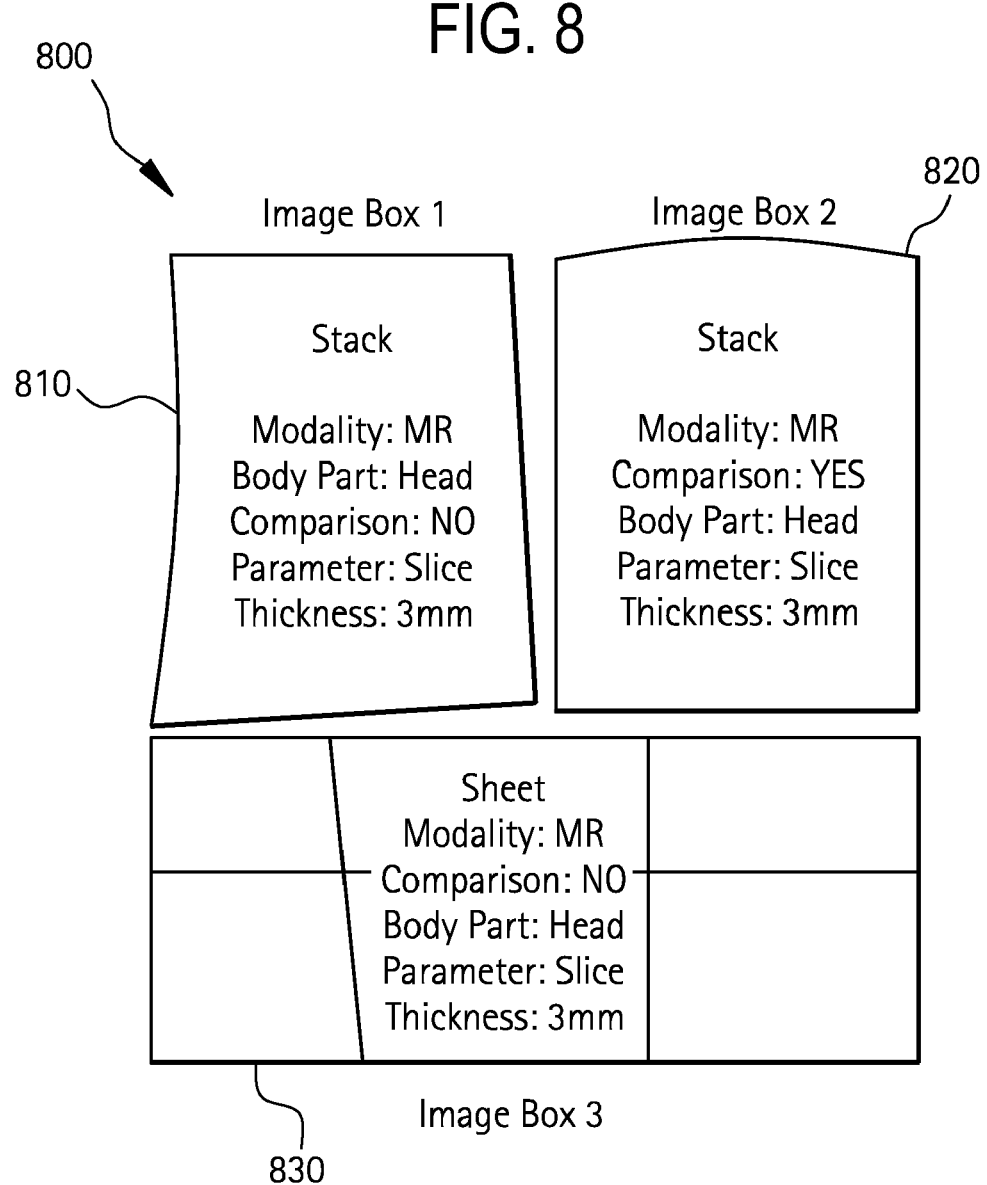
FIG. 8 illustrates creation of a hanging protocol using a graffiti-enabled workstation in accordance with an embodiment of the present invention.

FIG. 8 illustrates creation of a hanging protocol using a graffiti-enabled workstation in accordance with an embodiment of the present invention. A user draws a desired layout on an interface 800 using a graffiti pen and/or other gesture-based input device. As shown in FIG. 8, rectangular shapes identify image boxes 810, 820, 830. A tiled image box 830 represents a sheet with an up-count equal to a number of tiles. The tiles can be equally spaced and have equal size, for example. The system 800 allows the user to write a specification in an image box 810, 820, 830, where the system 800 recognizes the specification and converts the specification into an image box definition for the hanging protocol.

For example, a specification may include an image box type (e.g., stack, sheet, volume, etc.). A specification may include an upcount (e.g., 1, 2, 4, 6, 8, etc.). A specification may include a modality (e.g., magnetic resonance, computed tomography, X-ray, ultrasound, etc.). Additionally, a specification may include a body part (e.g., head, neck, chest, limb, etc.). A specification may further include a list of one or more procedures involved. A specification may also include a comparison indication (e.g., yes or no). In certain embodiments, a specification includes one or more series selection parameters (for example, one or more parameter names and values, such as parameter=slice thickness, value=3 mm, etc.). A specification may include other configuration information and/or settings, for example.

A graffiti- or gesture-enabled hanging protocol tool translates the created specification into a hanging protocol definition, as illustrated in FIG. 2. As described above, gesture-based/graffiti input is mapped to one or more commands, parameters and/or other input for a clinical system. The input is used to generate the hanging protocol for display of images at a clinical system, such as a PACS workstation. Image box specifications 810, 820, 830 are translated to display image boxes 910, 920, 930. The specification from FIG. 8 determines how data is displayed in the image boxes 910, 920, 930 of FIG. 9.

FIG. 10 illustrates a flow diagram for a method 1000 for graffiti-based hanging protocol creation in accordance with an embodiment of the present invention. At step 1010, a user generates gesture or graffiti input using an input, such as a hand, a graffiti pen and/or other instrument. The input may be generated on a touch screen, graffiti-enabled display, thin-air display, etc. The gesture/graffiti input describes a hanging protocol specification, for example.

At step 1020, the gesture/graffiti input is translated into a hanging protocol. For example, the specification reflected in the gesture/graffiti input is translated into a hanging protocol for displaying clinical images and other data at a workstation. At step 1030, clinical images and other data are displayed at a clinical workstation, such as a PACS or RIS/PACS workstation, in accordance with the defined hanging protocol.

Thus, certain embodiments provide an improved or simplified workflow for a clinical environment, such as radiology or surgery. Certain embodiments allow a user to operate a single interface device to access functionality and transfer data via gestures and/or other strokes. Certain embodiments provide a system and method for a user to consolidate the workflow of a plurality of applications and/or systems into a single interface.

Certain embodiments of the present invention provide increased efficient and throughput for medical personnel, such as radiologists and physicians. Systems and methods reduce desktop and operating room clutter, for example, and provide simplified interaction with applications and data. Repetitive motion injuries may also be reduced or eliminated.

Thus, certain embodiments leverage portable input devices, such as tablet and handheld computing devices, as well as graffiti/gesture-based interactions with both portable and desktop computing devices, to interact with and control healthcare applications and workflow. Certain embodiments provide an interface with graffiti/gesture-based interaction allowing users to design custom shortcuts for functionality and combinations/sequences of functionality to improve healthcare workflow and simplify user interaction with healthcare applications.

Certain embodiments facilitate interaction through a stylus- and/or touch-based interface with graffiti/gesture-based interaction that allow users to easily design custom shortcuts for existing menu items and/or other functionality. Certain embodiments facilitate definition and use of gestures in one or more languages. Certain embodiments provide ergonomic and intuitive gesture shortcuts to help reduce carpel tunnel syndrome and other repetitive injuries. Certain embodiments provide use of a portable interface to retrieve, review and diagnose images at the interface or another display. Certain embodiments allow graffiti or other gesture to be performed directly on top of an image or document to manipulate the image or document.

Certain embodiments reduce repetitive motions and gestures to afford more precise interactions. Certain embodiments allow a user to add more specific control to gestural input through additional cues based on size and position of the gesture-based input.

Certain embodiments provide a sterile user interface for use by surgeons and other clinicians operating in a sterile environment. Certain embodiments provide a gesture-based system that can be used in conjunction with a regular monitor and/or thin-air display to display and modify image and/or other clinical data. Certain embodiments provide an intuitive user interface without reliance on a graphical user interface. Pressure on a pen or other similar instrument can be varied to change a characteristic of a clinician application function, such as a velocity of scroll, zoom, cine, etc. Certain embodiments combine PACS, pressure sensitive instrumentation and graffiti to provide clinicians an effective user interface.

Certain embodiments provide free-form hanging protocol creation by drawing a layout and writing associated parameters. Certain embodiments provide a simple user interface facilitating reduced searching for controls on the screen. Certain embodiments allow creation of equal size or flexible size layouts, for example. Certain embodiments simulate the use of pen and paper to provide a more natural way for a user to create hanging protocol layout and specification.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for creating a hanging protocol based on gesture input in a clinical environment, said method comprising:

specifying a hanging protocol specification using gesture-based input, wherein said hanging protocol specification is defined by drawing a desired layout of one or more image boxes on an interface using said gesture-based input to create a new hanging protocol by providing the desired layout of one or more image boxes and a gesture written specification for each image box on the interface for translation into a hanging protocol for image display;

automatically translating said gesture-based input into a hanging protocol, wherein said translating said gesture-based input into a hanging protocol includes converting said hanging protocol specification into one or more image box definitions for said hanging protocol; and facilitating display of clinical information based on said hanging protocol.

2. The method of claim 1, wherein said hanging protocol specification comprises an image box type and at least one parameter.

3. The method of claim 1, wherein said gesture-based input includes a gesture component and at least one of a size component and a position component modifying said gesture component.

4. The method of claim 1, wherein said gesture-based input corresponds to a sequence of healthcare application functions for execution at a remote system.

5. The method of claim 1, wherein said gesture-based input includes a pressure component comprising at least one of a pressure applied to an instrument used to make said gesture and a pressure applied to a sensor surface.

6. The method of claim 1, further comprising customizing a translation between said gesture-based input describing said hanging protocol specific and said hanging protocol for at least one of a user and a group of users.

7. A computer-readable medium having a set of instructions for execution on a computer, said set of instructions comprising:

a sensor routine for detecting gesture-based input for a hanging protocol specification, wherein said hanging protocol specification is defined by drawing a desired layout of one or more image boxes on an interface using said gesture-based input;

a translation routine for automatically translating said gesture-based input to a corresponding hanging protocol definition, wherein said translating said gesture-based input into a hanging protocol definition includes converting a hanging protocol specification defined by said gesture-based input into one or more image box definitions for said hanging protocol to create a new hanging protocol by providing the desired layout of one or more image boxes and a gesture written specification for each image box on the interface for translation into a hanging protocol for image display; and a display routine facilitating display of clinical information based on said hanging protocol definition.

8. The computer-readable medium of claim 7 wherein said hanging protocol specification comprises an image box type, an upcount, a modality, a body part, a list of one or more procedures, a comparison indication and one or more series selection parameters.

9. The computer-readable medium of claim 7 wherein said gesture-based input further includes a characteristic associated with said gesture-based input.

10. The computer-readable medium of claim 9 wherein said translation routine modifies said hanging protocol definition corresponding to said gesture-based input using said characteristic associated with said gesture-based input.

11. The computer-readable medium of claim 9 wherein said characteristic includes at least one of a position and a size of said gesture-based input.

12. A gesture detection system, said system comprising:

a sensor surface configured to detect gesture-based input made on said sensor surface, said gesture-based input specifying a hanging protocol layout, wherein said hanging protocol layout is defined by drawing a desired layout of one or more image boxes on an interface using said gesture-based input to create a new hanging protocol by providing the desired layout of one or more image boxes and a gesture written specification for each image box on the interface for translation into a hanging protocol for image display;

a processor configured to identify said gesture-based input and automatically translate said gesture to a corresponding hanging protocol definition for display of image and clinical data, wherein said translating said gesture-based input into a hanging protocol definition includes converting a hanging protocol specification defined by said gesture-based input into one or more image box definitions for said hanging protocol, said processor to facilitate display of clinical information based on said hanging protocol.

13. The system of claim 12 wherein said gesture-based input specifying said hanging protocol layout comprises an image box type, an upcount, a modality, a body part, a list of one or more procedures, a comparison indication and one or more series selection parameters.

14. The system of claim 12 further comprising a graffiti input instrument for generating said gesture-based input on said sensor surface.

15. The system of claim 14 wherein at least one of a pressure exerted on said sensor surface and a pressure exerted on said instrument modifies said gesture-based input.

16. The system of claim 12 wherein said gesture-based input further includes a characteristic associated with said gesture-based input, said characteristic modifying said hanging protocol definition corresponding to said gesture-based input.

17. The system of claim 12 further comprising a display for displaying at least one of images and clinical data according to said hanging protocol definition.

* * * * *